May 17, 1960
E. J. HERBENAR
2,937,033
VEHICLE IDLER ARM ASSEMBLY
Filed May 19, 1958
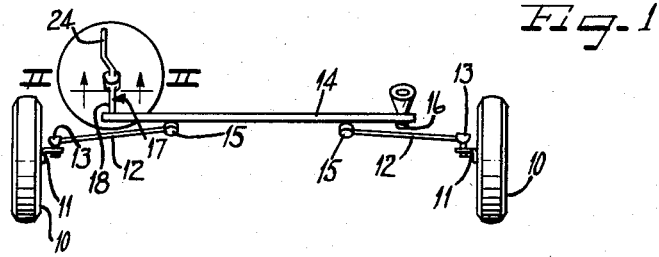
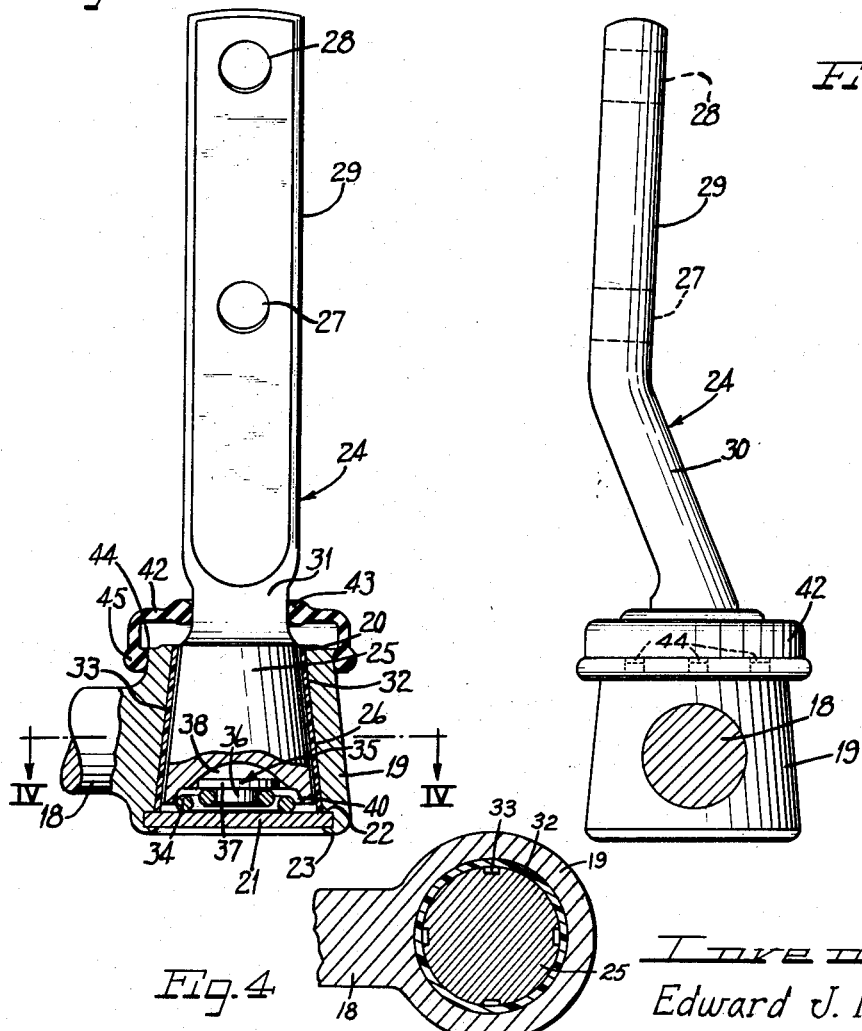
Inventor
Edward J. Herbenar
by
Hill Sherman Meroni Gross & Simpson
Attys

United States Patent Office 2,937,033
Patented May 17, 1960

2,937,033

VEHICLE IDLER ARM ASSEMBLY

Edward J. Herbenar, Detroit, Mich., assignor to Thompson Ramo Wooldridge Inc., a corporation of Ohio Application May 19, 1958, Serial No. 736,384

8 Claims. (Cl. 280—95)

This invention relates generally to an improved steering mechanism for use with dirigible vehicles, and more particularly to an idler arm construction for a parallelogram type steering linkage in which an idler arm stud bracket is secured for relative rotation within an idler arm socket which is tapered in complementary relationship thereto, and adapted to maintain smooth turning, perfect alignment with the socket by means of a self-lubricating plastic bearing having mating inner and outer surfaces.

In the parallelogram-type steering linkages employed on many dirigible vehicles, a cross link extending transversely of the vehicle frame is actuated at one end by a pitman arm operatively connected to a steering column through a gear box. The free end of the cross link is usually supported by an idler arm assembly so as to promote straight longitudinal movement of the cross link by the pitman arm.

Automotive idler arm assemblies presently in use generally employ threaded bushings which, because of their design, are relatively loose to begin with, and allow the steering linkage to move even when the steering wheel is held rigidly. This factor may affect the course of the car and also may change the "toe" of the front wheels while the car is in motion. The same detrimental results are found in other cars which employ rubber bushings, when the rubber loses its compression or takes a set.

According to the general features of the present invention, an idler arm stud bracket is attached to the frame of the vehicle, preferably on the side adjacent the free end of the cross link, and this bracket defines at its lower end a tapered bearing head which is cadmium plated to provide a smoother, longer wearing surface. The idler arm, which may take the form of a bar of steel suitably configured to bring the steering linkage into proper relationship with the bracket, defines a socket which is tapered in complementary relationship to the tapered bracket head, and a nylon bearing having a mating taper on both the inside and outside diameters thereof is interposed between the bracket head and the socket, grease grooves being provided on the internal diameter of the bearing. The socket and bearing are held in proper alignment with the bracket head by a spring which bears against a seat member received within a semi-spherical recess in the bracket head at its upper end and against a closure cap for the socket at its lower end. A minimum of wear is encountered with the type of bearing material used and when such wear does occur, the bearing and socket are concurrently brought into position by the spring to maintain a perfect alignment throughout the life of the joint. The taper of the head and associated bearing structure, in a preferred form of the invention, is slightly greater than required to form a locking relationship, or approximately from 12 to 15° from the longitudinal axis of the bracket head, so that a constant torque is maintained.

Accordingly, it is an object of the invention to provide an idler arm assembly as described which affords a smoother turning, longer lasting insulated joint.

Another object of the present invention is to provide an idler arm assembly which may be joined to the frame of a vehicle by a joint which eliminates looseness in steering linkage to maintain the vehicle accurately on course and to prevent toeing of the front wheels.

Another object of the invention is to provide an idler arm assembly as described wherein a bracket is provided having a tapered bracket head which is cadmium plated to afford a longer wearing surface and smooth turning action relative to a complementarily tapered nylon bearing and a similarly tapered bushing.

Another object of the invention is to provide an idler arm assembly as described wherein little or no wear is produced but which is adapted to afford a self-adjusting action so that if wear occurs, perfect alignment will be maintained throughout the life of the joint.

Another object of the invention is to provide an idler arm assembly in which a stud bracket head is received in a socket of the idler arm with the bearing elements having a taper just slightly greater than a locking taper, to afford constant torque.

Another object of the invention is to provide a joint having a stud bracket head which is tapered as described and a nylon bearing whose internal and external surfaces are tapered in mating relation to the head of the stud bracket and to the socket or bushing receiving the head, the bearing providing internal grease grooves on the internal diameter thereof and cooperating with the cadmium plated head to augment the smooth turning action of the joint.

Yet another object of the invention is to provide a spring and seat means adapted to engage within a semi-spherical recess of the idler arm bracket to maintain the bracket head, bearing and socket elements in the aforementioned self-adjusting alignment.

Other objects and advantages of the invention will become apparent as the description proceeds in accordance with the drawings in which:

Figure 1 is a simplified end view of a conventional parallelogram type automotive steering linkage for which the idler arm assembly of the invention is used;

Figure 2 is a side elevational view, partly broken away and in vertical section, of the idler arm assembly of the invention;

Figure 3 is an end elevational view of the stud bracket for the assembly according to the invention; and Figure 4 is a transverse cross-sectional view taken along line VI—VI of Figure 2.

Referring now to Figure 1, a pair of wheels 10 of a dirigible vehicle are shown supported on stub axles 11, the steering arm elements and associated parts being shown somewhat in simplified form. Tie rods 12 are pivotally secured to the means 11 by joints 13 and are secured pivotally to a cross link 14 by joints 15. The cross link 14 may be connected to one end of a pitman arm assembly 16 which may be suitably suspended on rock shaft means or the like for operative connection with a steering column by gear box means (not shown) in accordance with the understanding of those skilled in the art.

In order to support the steering linkage in proper geometric relationship and to transmit a steering load through a change of direction, an idler arm assembly, indicated generally by reference numeral 17, provides a movable joint between the other end of the cross link 14 and a side beam (not shown) of the vehicle frame. Referring more specifically to Figures 2 and 3, the idler arm assembly is shown as including an idler arm 18 which may be formed from a suitable piece of steel bar stock and shaped to bring the linkage into proper relationship with a joint structure now to be described.

The end portion of the idler arm adjacent the frame to which it is to be connected defines a socket 19 having an opening 20 at its upper end and closed at its lower end by a cap 21 seated against an annular shoulder 22 defined in the socket and held in position by a rolled-over edge 23 of the socket wall. An idler arm stud bracket 24 is provided in accordance with the invention having a tapered frusto-conical head 25 adapted to be received in the tapered central bore 26 of the socket 19 prior to securing the cap 21 in position, and an upstanding bracket element which defines apertures 27 and 28 in a flattened upper portion 29 thereof for receiving fastening elements by means of which the stud bracket may be secured to a vehicle frame in accordance with the understanding of those skilled in the art. A lower portion 30 of the bracket is disposed in predetermined offset relationship to the upper portion 29 in order to maintain a desired alignment of parts, and the head 25 is formed integrally with the portion 30 by means of a cylindrical portion 31.

In order to provide a smoother turning, longer lasting joint, the head 25 is cadmium plated, and a tough, self-lubricating plastic bearing 32 is interposed between the head 25 and socket 19 and formed with mating inner and outer diameters. In the preferred embodiment of the invention, the bearing 32 is formed of nylon and defines grease grooves 33 on its inner diameter, and it will be appreciated that the head 25 will turn naturally in the bearing 32 with the grooves 33 augmenting the smooth turning action.

In order to maintain a substantially constant turning resistance in the joint as well as to afford a self-aligning action as hereinafter set forth, the head 25, socket 19, and bearing 32 are each formed with a complementary taper which is slightly greater than needed to provide a locking engagement therebetween and extends, in the embodiment illustrated, upwardly and inwardly at an angle approximately 12° to 15° from the vertical axis of the head. A locking action would, on the other hand, be afforded at from 0° to approximately 12° with the materials used. It will be understood that the upper limit for a locking angle may vary with different materials and that the preferred taper will be slightly greater than such angle. The bearing 32 and the head 25 are held in position by means of a spring 34 which bears at its lower end upon the cap or closure 21 and at its upper end against a seat 35 having a depending cylindrical element 36 in relatively snug engagement with the upper turn of the spring and a disc-like bearing portion 37 which is adapted to seat within a generally semi-spherical recess 38 defined coaxially within the lower portion of the bearing head 25. The spring 34 is received in a recessed portion 40 which is somewhat wider than the semi-spherical recess 38, and maintains the socket 12 and head 25 in perfect alignment throughout the life of the joint.

Because of the nature of the bearing materials utilized, i.e., the cadmium plate surface of the head 25 and the nylon construction of the bearing element 32, very little or no wear is encountered in the joint, but when such wear does occur, the socket and the bearing 32 are urged axially against the head 25 by the spring 34 to afford a self-adjusting action throughout the life of the joint, and to maintain the parts in a close fitting and smooth turning, insulated relationship. The joint is permanently lubricated, so that an annular cap 42 is provided in sealing relationship on the cylindrical portion 30 of the bracket 24, at the upper internal bead 43 thereof, and in order to secure the cap in sealing relationship to the socket 19, a plurality of finger-like projections 44 are coined or forged into the socket for engagement with the lower exterior bead 45 of the cap.

There has thus been provided an idler arm assembly which affords easy, accurate steering throughout the life of the joint and eliminates the hazards of looseness and deformation encountered in the threaded or rubber bushings currently in use, and which is further characterized by simplicity in structure and ease and economy of manufacture.

Although I have herein set forth and described my invention with respect to certain principles and details thereof, it will be obvious to those skilled in the art that these may be varied without departing from the spirit and scope of the invention as set forth in the hereonto appended claims.

I claim as my invention:

1. An idler arm assembly comprising an idler arm having a socket with an open end and a closed end, a stud bracket having a head rotatably received in said socket and extending through the open end thereof, said head and said socket having a complementary taper slightly greater than necessary to maintain a locking relationship therebetween and spring means including a disk bearing against said head and a spring bearing against said disk at its upper end and against the closed end of said socket at its lower end to maintain said socket in self-adjusting alignment with said head.

2. An idler arm assembly comprising an idler arm having a socket at the end thereof, a stud bracket having a head rotatably received in said socket, a self-lubricating plastic bearing interposed between said socket and said head, said head, bearing and socket being tapered to an extent slightly greater than needed to provide a locking relationship therebetween, a wall closing the wider end of said socket formed by said taper and spring means including a disk bearing against said head and a spring bearing at its upper end against said disk and at its lower end against said wall to urge said socket and said bearing into continuous perfect alignment with said head.

3. An idler arm assembly comprising a stud bracket having an upstanding portion and a head, an idler arm defining a socket having an open end and a closed end and receiving said head for relative rotation therebetween, said head having a taper complementary to the taper of said socket and slightly greater than required to maintain a locking relationship with said socket, and defining a substantially spherical recess in the lower end portion thereof, a disk adapted to engage in bearing relationship within said spherical recess in said head and a spring bearing against said disk and the closed end of said socket whereby to maintain said socket in self-adjusting alignment with said head.

4. An idler arm assembly comprising a stud bracket having an upstanding bracket element and a depending frusto-conical head, said head defining a substantially semi-spherical recess coaxially in its lower end, an idler arm having a socket with an open end and a closed end and rotatably receiving said head, said stud bracket extending upwardly through the open end of said socket, a nylon bearing disposed between said head and said socket, said head, bearing and socket each having a mating taper slightly greater than required to maintain a locking relationship therebetween, a disk adapted to engage in bearing relationship in the spherical recess of said head, and a spring urging said disk into said bearing relationship within said recess and bearing against the closed end of said socket whereby to maintain said head bearing and socket in perfect self-adjusting alignment.

5. An idler arm assembly comprising a stud bracket having an upstanding bracket element and a depending frusto-conical head, an idler arm having a socket with an open end and a closed end and rotatably receiving said head and defining a plurality of grease grooves on its inner diameter, said stud bracket extending upwardly through said open end and a nylon bearing interposed between said head and said socket, said bearing, head and socket defining complementary mating surfaces tapered at an angle slightly greater than required to maintain a locking relationship therebetween.

6. An idler arm assembly comprising a stud bracket having an upstanding bracket element and a depending frusto-conical head, said head defining a substantially semi-spherical recess coaxially in its lower end, an idler arm having a socket with an open end and a closed end and rotatably receiving said head, said stud bracket extending upwardly through the open end of said socket, a nylon bearing disposed between said head and said socket, said head, bearing and socket each having a mating taper slightly greater than required to maintain a locking relationship therebetween, a disk adapted to engage in bearing relationship in the spherical recess of said head and a spring urging said disk into said bearing relationship within said recess and bearing against the closed end of said socket whereby to maintain said head bearing and socket in perfect self-adjusting alignment, said disk having a depending cylindrical extension engaging said spring.

7. An idler arm assembly comprising an idler arm having a socket defining an upwardly and inwardly tapered bore closed at the larger end thereof, a stud bracket having a depending frusto-conical head received in said socket for rotation relative thereto, a bearing having internal and external surfaces disposed in mating relationship with said head and said socket respectively, a disk adapted to engage said head at the lower end thereof in abutting bearing relationship, a spring urging said disk into said bearing relationship with said head, said head defining a substantially semi-spherical recess receiving said disk, and a cap member engaging said bracket in substantially sealing relationship above said socket, said socket defining a plurality of finger-like projections adapted to engage the lower edge of said seal.

8. An idler arm assembly comprising a stud bracket having an upstanding portion and a cadmium-plated head of substantially frusto-conical configuration formed integrally therewith, an idler arm having a socket at one end thereof defining a bore tapered in complementary relationship to the taper of said head and adapted to receive said head in relatively rotatable relationship therein, a wall closing the wider end of said bore, a nylon bearing element having mating surfaces interposed between said head and said socket, and spring means bearing against said wall and the lower end of said head maintaining said head in continuous, self-adjusting engagement with said bearing.

References Cited in the file of this patent

UNITED STATES PATENTS

| | | |
|---|---|---|
| 2,451,060 | Booth | Oct. 12, 1948 |
| 2,470,215 | Graham | May 17, 1949 |
| 2,544,582 | Booth | May 16, 1951 |
| 2,620,202 | Coleman | Dec. 2, 1952 |
| 2,707,645 | Moskovitz | May 3, 1955 |
| 2,807,486 | Bixby | Sept. 24, 1957 |
| 2,878,047 | Booth | Mar. 17, 1959 |

FOREIGN PATENTS

| | | |
|---|---|---|
| 737,811 | Great Britain | Oct. 5, 1955 |